United States Patent
Kwon et al.

(10) Patent No.: US 12,136,731 B2
(45) Date of Patent: *Nov. 5, 2024

(54) NEGATIVE ELECTRODE ACTIVE MATERIAL, NEGATIVE ELECTRODE INCLUDING THE SAME, AND LITHIUM SECONDARY BATTERY

(71) Applicant: LG ENERGY SOLUTION, LTD., Seoul (KR)

(72) Inventors: Yo Han Kwon, Daejeon (KR); Dong Chan Lee, Daejeon (KR); In Sung Uhm, Daejeon (KR); Jung Woo Yoo, Daejeon (KR); Jae Hyun Lee, Daejeon (KR); Je Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 692 days.

This patent is subject to a terminal disclaimer.

(21) Appl. No.: 17/291,409

(22) PCT Filed: Dec. 10, 2019

(86) PCT No.: PCT/KR2019/017370
§ 371 (c)(1),
(2) Date: May 5, 2021

(87) PCT Pub. No.: WO2020/122549
PCT Pub. Date: Jun. 18, 2020

(65) Prior Publication Data
US 2021/0367231 A1    Nov. 25, 2021

(30) Foreign Application Priority Data
Dec. 10, 2018 (KR) .................. 10-2018-0158018

(51) Int. Cl.
*H01M 4/38* (2006.01)
*H01M 4/134* (2010.01)
(Continued)

(52) U.S. Cl.
CPC .......... *H01M 4/386* (2013.01); *H01M 4/134* (2013.01); *H01M 4/623* (2013.01); *H01M 4/625* (2013.01);
(Continued)

(58) Field of Classification Search
CPC ...... H01M 4/386; H01M 4/134; H01M 4/623; H01M 4/625; H01M 10/0525
See application file for complete search history.

(56) References Cited

U.S. PATENT DOCUMENTS

| 11,862,789 B2 * | 1/2024 | Kwon .................. H01M 4/622 |
| 2002/0037451 A1 | 3/2002 | Eguchi et al. |

(Continued)

FOREIGN PATENT DOCUMENTS

| CN | 104603191 A | 5/2015 |
| CN | 108483710 A | 2/2017 |

(Continued)

OTHER PUBLICATIONS

KR-101620142MT (Year: 2012).*
(Continued)

*Primary Examiner* — Alexander Usyatinsky
(74) *Attorney, Agent, or Firm* — Birch, Stewart, Kolasch & Birch, LLP (57) ABSTRACT

A negative electrode active material that includes an active material core that allows for the intercalation and deintercalation of lithium ions. The negative electrode active material also includes a plurality of conductive materials positioned on a surface of the active material core, a plurality of organic linkers each including a hydrophobic group and a
(Continued)

polar functional group bonded to the hydrophobic group, and an elastic unit. The elastic unit includes an elastic moiety having two or more binding sites, and a functional group bonded to a binding site of the elastic moiety. The functional group reacts with the polar functional group of the organic linker, and one or more of the plurality of organic linkers are connected to the conductive materials through the hydrophobic groups of the organic linkers.

16 Claims, 6 Drawing Sheets

(51) Int. Cl.
　　 *H01M 4/62* 　　 (2006.01)
　　 *H01M 10/0525* 　　 (2010.01)
　　 *H01M 4/02* 　　 (2006.01)
(52) U.S. Cl.
　　 CPC .. *H01M 10/0525* (2013.01); *H01M 2004/027* (2013.01)

(56) References Cited

U.S. PATENT DOCUMENTS

| | | | |
|---|---|---|---|
| 2009/0305132 A1 | 12/2009 | Gauthier et al. | |
| 2013/0309495 A1 | 11/2013 | Do et al. | |
| 2014/0255785 A1* | 9/2014 | Do | C09D 7/61 429/232 |
| 2015/0311504 A1 | 10/2015 | Hong et al. | |
| 2016/0046794 A1 | 2/2016 | Choi et al. | |
| 2016/0256873 A1 | 9/2016 | Do et al. | |
| 2016/0260966 A1* | 9/2016 | Ohsawa | H01M 4/625 |
| 2016/0351908 A1 | 12/2016 | Du et al. | |
| 2017/0222212 A1 | 8/2017 | Hong et al. | |
| 2018/0261844 A1 | 9/2018 | Kim et al. | |
| 2019/0051897 A1 | 2/2019 | Kamo et al. | |
| 2019/0120782 A1 | 4/2019 | Lee et al. | |
| 2019/0177509 A1 | 6/2019 | Choi et al. | |
| 2021/0184202 A1 | 6/2021 | Salem et al. | |

FOREIGN PATENT DOCUMENTS

| | | | |
|---|---|---|---|
| EP | 3407409 A1 | | 11/2018 |
| JP | 2008-542979 A | | 11/2008 |
| JP | 2011-11928 A | | 1/2011 |
| JP | 2015-13315 A | | 3/2015 |
| JP | 2015-530455 A | | 10/2015 |
| JP | 2017503310 A | * | 1/2017 |
| JP | 2017-514290 A | | 6/2017 |
| KR | 10-2002-0011108 A | | 2/2002 |
| KR | 101620142 B1 | * | 5/2012 |
| KR | 10-2013-0037329 A | | 4/2013 |
| KR | 10-2014-0123805 A | | 10/2014 |
| KR | 10-1454407 B1 | | 11/2014 |
| KR | 20150026277 A | * | 3/2015 |
| KR | 10-2016-0123314 A | | 10/2015 |
| KR | 10-2015-0124928 A | | 11/2015 |
| KR | 10-1626561 B1 | | 6/2016 |
| KR | 10-2016-0149862 A | | 12/2016 |
| KR | 10-2017-0059899 A | | 5/2017 |
| KR | 10-2017-0130747 A | | 11/2017 |
| KR | 10-2018-0023620 A | | 3/2018 |
| KR | 10-1838815 B1 | | 3/2018 |
| WO | WO 2015/073674 A1 | | 5/2015 |

OTHER PUBLICATIONS

KR-20150026277MT (Year: 2016).*
KR20150124928 MT (Year: 2015).*
Extended European Search Report for Application No. 19896249.0, dated Nov. 18, 2021.
International Search Report (PCT/ISA/210) issued in PCT/KR2019/017370, dated Mar. 25, 2020.

\* cited by examiner

NEGATIVE ELECTRODE ACTIVE MATERIAL, NEGATIVE ELECTRODE INCLUDING THE SAME, AND LITHIUM SECONDARY BATTERY

CROSS-REFERENCE TO RELATED APPLICATION

This application claims priority to and the benefit of Korean Patent Application No. 10-2018-0158018, filed on Dec. 10, 2018, the disclosure of which is incorporated herein by reference in its entirety.

TECHNICAL FIELD

The present invention relates to a negative electrode active material, a negative electrode including the negative electrode active material, and a lithium secondary battery. More particularly, the present invention relates to: a negative electrode active material in which a conductive material is stably attached to a surface thereof through an organic linker; a negative electrode including the negative electrode active material; and a lithium secondary battery.

BACKGROUND ART

Due to a rapid increase in the use of fossil fuels, the demand for the use of an alternative energy source or clean energy source is increasing, and in line with this increasing demand, the fields of power generation and power storage using electrochemical reactions are being most actively studied.

A representative example of an electrochemical device that makes use of such electrochemical energy is a secondary battery, and application areas thereof are gradually expanding. Recently, as technologies for portable devices such as portable computers, mobile telephones, cameras, and the like are developed and demands for the portable devices increase, demands for secondary batteries as a power source are rapidly increasing, and among such secondary batteries, lithium secondary batteries having a high energy density, that is, lithium secondary batteries having high capacity, have been extensively studied, commercialized, and widely used.

Generally, secondary batteries consist of a positive electrode, a negative electrode, an electrolyte, and a separator. As a positive electrode active material constituting a positive electrode of a lithium secondary battery, metal oxides such as $LiCoO_2$, $LiMnO_2$, $LiMn_2O_4$, or $LiCrO_2$ have been used, and as a negative electrode active material constituting a negative electrode, materials such as metal lithium, carbon-based material (e.g., graphite, activated carbon, or the like), silicon oxides ($SiO_x$), or the like have been used. Among the negative electrode active materials, metal lithium was mainly used initially, but since the phenomenon whereby lithium atoms grew on a metal lithium surface, damaging the separator and accordingly damaging the battery, occurred as charging-discharging cycles progressed, carbon-based materials have been mainly used recently. However, since carbon-based materials have the disadvantage of small capacity, having a theoretical capacity of only about 400 mAh/g, various studies have been conducted to replace such carbon-based negative electrode active materials with high capacity materials such as silicon (Si) having a high theoretical capacity (4,200 mAh/g) and the like.

However, there is the problem that since materials having high capacity undergo an excessive volume change during charging and discharging, an electrical short circuit is caused in the electrode, and the phenomenon whereby a thick and unstable solid electrolyte interface (SEI) grows and results in degradation of battery performance occurs.

Conventionally, in order to address this problem, a method of forming a carbon coating layer on a surface of silicon-based particles or a method of using an additional conductive material has been attempted.

However, the method of forming a carbon coating layer has the problem that since a process of applying heat is required for the formation of the carbon coating layer, either cracks are generated or porosity is reduced in the silicon-based particles to reduce efficiency, and the method of using an additional conductive material has the problem that as the amount of conductive materials increases, the aggregation of conductive materials occurs.

Therefore, as disclosed in Korean Laid-Open Patent Application No. 10-2016-0149862, a method of further reinforcing control of a volume change by further providing a polymer composite on a carbon coating layer has been attempted. However, even if the additional polymer composite is provided, it is not easy to control the volume change, but rather, a problem that the conductivity of the active material is degraded, causing resistance to increase and the capacity retention rate of the battery to degrade, may occur. Also, since the silicon-based particles are excessively coated such that lithium ions are not easily intercalated, there is a problem of a reduction in capacity.

Therefore, there is a demand for the development of a new technique capable of solving problems such as an electrical short circuit in an electrode, a performance degradation phenomenon, and the like which may be caused by the volume change of a high-capacity negative electrode active material.

RELATED-ART DOCUMENT

Patent Document

Korean Laid-Open Patent Application No. 10-2016-0149862

DISCLOSURE

Technical Problem

One objective of the present invention is to provide a high-capacity negative electrode active material that does not have the problem of an electrical short circuit in an electrode and has excellent conductivity.

Another objective of the present invention is to provide a negative electrode for a lithium secondary battery, which includes the negative electrode active material.

Still another objective of the present invention is to provide a lithium secondary battery, which includes the negative electrode.

Technical Solution

In order to achieve one of the objectives, one aspect of the present invention provides a negative electrode active material, which includes: an active material core that allows for the intercalation and deintercalation of lithium ions; a plurality of conductive materials that are positioned on a surface of the active material core; a plurality of organic linkers wherein each organic linker includes a hydrophobic group and a polar functional group bonded to the hydrophobic group; and an elastic unit, wherein the elastic unit includes: an elastic moiety having two or more binding sites; and a functional group that is bonded to a binding site of the elastic moiety and wherein the functional group reacts with the polar functional group of the organic linker, and one or more of the plurality of organic linkers are connected to the conductive materials through the hydrophobic groups of the organic linkers, and the polar functional group of the organic linker is bonded to a functional group on the surface of the active material core or to the functional group of the elastic unit.

In order to achieve another objective, another aspect of the present invention provides a negative electrode, which includes: a negative electrode current collector; and a negative electrode active material layer that is formed on the negative electrode current collector and includes a negative electrode material, wherein the negative electrode material includes the above-described negative electrode active material.

In order to achieve the other objective, still another aspect of the present invention includes a lithium secondary battery, which includes: the above-described negative electrode; a positive electrode disposed opposite to the negative electrode; a separator interposed between the negative electrode and the positive electrode; and an electrolyte.

Advantageous Effects

The negative electrode active material of the present invention includes conductive materials that are positioned on a surface of an active material core allowing the intercalation and deintercalation of lithium ions, and the conductive material has one or more organic linkers bonded thereto. Since the organic linker is bonded to the surface of the active material core or to an elastic unit, the conductive material is firmly attached to a surface of the negative electrode active material, and since the conductive materials are connected to each other, the conductive material can provide electrical conductivity that persists even when the volume of the negative electrode active material is changed due to charging and discharging, and improved lifetime characteristics can be exhibited.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

As used herein, the term "polycyclic ring group" refers to a condensed ring or condensed nucleus, which is a ring in which two or more rings are linked while sharing two or more atoms thereof, unless otherwise noted.

As used herein, the term "alkyl" refers to a straight-chain, cyclic, or branched hydrocarbon residue unless otherwise noted.

As used herein, the term "linear conductive material" refers to a conductive material of a cylindrical type, tube type, or the like having a fibrous structure unless otherwise noted, the term "planar conductive material" refers to a flat, sheet-shaped, or flake-like conductive material unless otherwise noted, and the term "particle-like conductive material" refers to a generally used conductive material which has the form of substantially spherical particles.

<Negative Electrode Active Material>

One aspect of the present invention relates to a negative electrode active material, specifically, a negative electrode active material for a lithium secondary battery.

The negative electrode active material according to the present invention includes: an active material core that allows the intercalation and deintercalation of lithium ions; a plurality of conductive materials positioned on a surface of the active material core; a plurality of organic linkers each including a hydrophobic group and a polar functional group bonded to the hydrophobic group; and an elastic unit, wherein the elastic unit includes: an elastic moiety having two or more binding sites; and a functional group that is bonded to a binding site of the elastic moiety and allowed to react with the polar functional group of the organic linker, and one or more of the plurality of organic linkers are connected to the conductive materials through the hydrophobic groups of the organic linkers, and the polar functional group of the organic linker is bonded to a functional group of the surface of the active material core or to the functional group of the elastic unit.

According to the present invention, in the negative electrode active material, the conductive materials may be firmly attached to a surface of the active material core by the organic linker, and since the conductive materials may be connected to each other through the elastic unit, the conductive material can provide persistent electrical conductivity among the active materials even when the volume of the negative electrode active material is increased or reduced due to charging and discharging, and therefore, improved stability can be exhibited.

The active material core is not particularly limited as long as it allows the intercalation and deintercalation of lithium ions, but when it is a high-capacity material and undergoes a large volume change during charging and discharging, the effect of using the organic linker and elastic unit of the present invention and the plurality of conductive materials that are either connected to the active material core or connected to each other can be more advantageously exhibited. The active material core that allows the intercalation and deintercalation of lithium ions may be one or more selected from the group consisting of Si, $SiO_x$ (0<x<2), Sn, $SnO_2$, and an Si-metal alloy. Examples of a metal capable of forming such an Si-metal alloy include Al, Sn, Ag, Fe, Bi, Mg, Mn, Zn, In, Ge, Pb, and Ti, and examples of the metal oxide include $SnO_2$, $TiO_2$, $Co_3O_4$, $Fe_3O_4$, and $Mn_3O_4$.

The average particle diameter ($D_{50}$) of the active material core may be in the range of 0.01 to 30 μm, specifically 0.5 to 30 μm, and more specifically 1 to 20 μm. When the average particle diameter ($D_{50}$) of the active material core satisfies the above-described range, the negative electrode may have an appropriate capacity per volume due to having an appropriate density, and it is possible to prevent the thickness of the negative electrode from becoming excessively thick due to the volume expansion of the negative electrode active material.

In the present invention, the average particle diameter ($D_{50}$) may be defined as a particle diameter corresponding to the $50^{th}$ percentile in the particle diameter distribution curve. Although not particularly limited, the average particle diameter may be measured using, for example, a laser diffraction method or a scanning electron microscope (SEM) image. The laser diffraction method generally allows for the measurement of a particle diameter ranging from a submicron level to several millimeters, and may produce a result having high reproducibility and high resolution.

The active material core may be present in an amount of 30 wt % to 99 wt %, preferably 60 wt % to 97 wt %, and more preferably 70 wt % to 80 wt % in the negative electrode active material for the purpose of easily realizing a lifetime characteristics improvement effect provided by the conductive network to be described below while ensuring sufficient capacity characteristics.

There are a plurality of the conductive materials, and the conductive materials are positioned on a surface of the active material core. As will be described below, one or more organic linkers are bonded to the conductive materials through hydrophobic groups of the organic linkers, thereby allowing the conductive materials to be connected to the surface of the active material core, and two or more conductive materials of the plurality of conductive materials can be connected to each other through the elastic unit and form a conductive network.

The conductive material includes at least one of a linear conductive material and a planar conductive material, and two or more of the plurality of conductive materials may be connected to each other through the elastic unit.

The linear conductive material may form a fibrous structure, and may be one or more selected from the group consisting of a carbon fiber, a carbon nanofiber (CNF), a metal fiber, a carbon nanotube (CNT), and a conductive whisker, specifically a carbon fiber, and more specifically a CNT.

In addition, the planar conductive material may be flat, sheet-shaped, or flake-like, and may be one or more selected from the group consisting of graphene, a metal thin film, and a MXene.

Preferably, the conductive material includes a linear conductive material, and this is desirable in terms of the fact that since the conductive material has a linear structure, a conductive network which improves the electrical connection between active materials can be stably formed.

The conductive material may be included in the negative electrode active material in an amount of 0.05 parts by weight to 15 parts by weight, preferably 0.3 parts by weight to 12 parts by weight, and more preferably 0.5 parts by weight to 5 parts by weight relative to 100 parts by weight of the active material core. It is preferred that the content of the conductive material is in the above-described range because, within this range, it is possible to sufficiently form an electrical network of the active material while preventing the initial efficiency of the active material and capacity from being lowered due to the excessive addition of a conductive material.

The conductive material may be included in the negative electrode active material in an amount of 0.05 wt % to 5 wt %, preferably 0.3 wt % to 3.5 wt %, and more preferably 0.5 wt % to 2 wt %. It is preferred that the content of the conductive material is in the above-described range because, within this range, it is possible to sufficiently form an electrical network of the active material while preventing the initial efficiency of the active material and capacity from being lowered due to the excessive addition of a conductive material.

There are a plurality of the organic linkers, and the organic linkers include a hydrophobic group and a polar functional group that is bonded to the hydrophobic group. As will be described below, one or more of the plurality of organic linkers may be linked to the conductive material through the hydrophobic groups of the organic linkers. In addition, the polar functional group of the organic linker is bonded to a functional group (e.g., hydroxyl group) of a surface of the active material core or to a functional group of the elastic unit to be described below. Accordingly, the organic linker may allow the conductive material to be firmly bonded to the surface of the active material core and, at the same time, play a role of allowing two or more of the plurality of conductive materials to be connected to each other.

Specifically, it is generally difficult for conductive materials to be dispersed in a solvent, and when it is intended to introduce the conductive materials to a surface of a negative electrode active material or to the inside of a negative electrode, the conductive materials are difficult to be introduced in a uniformly dispersed form due to the phenomenon whereby they are agglomerated due to attraction therebetween. Therefore, when the linear conductive material or the planar conductive material is to be used, it is usually used together with a dispersant (surfactant). However, since most dispersants are based on a weak attraction between materials, there is a difficulty in having the linear conductive material or the planar conductive material bonded in the negative electrode active material and thereby forming a stable electrical network, and when a volume change of the negative electrode active material occurs during charging and discharging, the phenomenon whereby the conductive material is detached from a surface of the negative electrode active material occurs. In this case, it is difficult to avoid a degradation in battery performance even though the linear conductive material or the planar conductive material has been introduced in order to maintain appropriate conductivity in response to the volume change of the negative electrode active material.

In order to address the above-described problems, in the negative electrode active material of the present invention, the organic linkers, which are compounds including a hydrophobic group and a polar functional group, are introduced to allow the conductive materials to be firmly attached to a surface of the active material core through the organic linker, and in the meantime, two or more conductive materials are allowed to be connected to each other through the organic linkers. Therefore, the conductive materials can stably provide electrical conductivity even when the volume of the negative electrode active material changes.

The conductive material may be connected to a surface of the active material core through one or more organic linkers. When the conductive material is a linear conductive material, it may be linearly contacted with or attached to the active material core, and when the conductive material is a planar conductive material, it may be contacted with the active material core in a face-to-face manner, and therefore, stable electrical connection can be achieved. Since the conductive material is therefore positioned between two or more active materials while crossing the active materials, the conductive material allows an electrical contact between the negative electrode active materials to be increased. Therefore, the phenomenon whereby an electrical network is disconnected due to a change in the volume, position, or morphology of the negative electrode active material can be minimized, and further, an increase in the resistance of a negative electrode due to the disconnection of an electrical network can be suppressed.

The organic linker is a compound that may impart a bonding ability between the conductive material and a surface of the active material and includes a hydrophobic group and a polar functional group in its molecular structure. Of the plurality of organic linkers, one or more organic linkers are connected to the conductive materials through hydrophobic groups thereof.

The hydrophobic group may include one or more selected from the group consisting of a ring group having a π-electron conjugated structure and a C3-C20 alkyl group.

Specifically, the hydrophobic structure of the organic linker interacts with and is bonded to the conductive material by van der Waals attraction. Specifically, a conjugated π-electron of a ring having a π-electron conjugated structure may form a van der Waals bond with a π electron included in the conductive material, or an electron of an alkyl group may form a van der Waals bond with an electron of the conductive material.

The ring group having a π-electron conjugated structure may refer to an aromatic ring in which the number of electrons satisfies the "4n+2 rule," specifically two or more rings which are linked, and more specifically two or more rings making up a condensed ring structure. The ring group having a π-electron conjugated structure may include, for example, one or more selected from the group consisting of benzene, pyrene, naphthalene, anthracene, benzopyrene, phenanthrene, fluoranthene, chrysene, perylene, benz[a]anthracene, acenaphthylene, coronene, triphenylene, and tetracene.

In one exemplary embodiment of the present invention, the ring group having a π-electron conjugated structure may be a polycyclic ring group in which four or more rings are linked. The "polycyclic ring group in which four or more rings are linked" may include the states in which polycyclic ring groups include four or more rings on the inside thereof, and may include one or more selected from the group consisting of pyrene, benzopyrene, fluoranthene, chrysene, perylene, benz[a]anthracene, coronene, triphenylene, and tetracene.

In addition, the alkyl group may be a C3-C20 alkyl group.

The polar functional group of the organic linker is bonded to a functional group positioned on a surface of the active material core or to a functional group of the elastic unit to be described below.

The polar functional group may be bonded to or substituted on a ring having a π-electron conjugated structure of the organic linker or an alkyl group of the organic linker, and may provide an effect of improving dispersibility in a solvent. In addition, the polar functional group may be bonded to a functional group positioned on a surface of the active material core and thereby allow the conductive material bonded to the organic linker to be attached to the surface of the active material core, or may be bonded to the elastic unit.

In addition, since the polar functional group has excellent affinity with solvents, the polar functional group may allow the organic linker to be effectively dispersed in a solvent and, accordingly, a linear conductive material bonded to the organic linker to be effectively dispersed (i.e., debundled) in the solvent without being agglomerated.

The polar functional group may be connected or attached to a surface of the active material core by being bonded to a functional group, specifically a functional group including —OH, located on the surface of the active material core. The functional group located on the surface of the active material core and including —OH may be formed as the surface of the active material core is oxidized by oxygen in the air. Since the bonding between the polar functional group and a functional group including —OH is a chemical bond and thus the organic linker and the linear conductive material are strongly attached to the active material core, an effect of maintaining stable electrical conductivity even when the volume of the active material core changes can be provided.

In the negative electrode active material according to one exemplary embodiment of the present invention, when the hydrophobic group of the organic linker is connected to the conductive material and the polar functional group is connected to a surface of the active material core, the state in which the active material core, the organic linker, and the conductive material are bonded may be expressed as "active material core:chemical bonding of polar functional group with —OH group:organic linker: π-π interaction:conductive material."

In addition, the polar functional group may be connected to a functional group of the elastic unit by being bonded to the same. The bonding between the polar functional group and the functional group of the elastic unit is a chemical bond, and the conductive materials, to which the organic linkers are connected, may be connected to each other through the elastic unit and form a conductive material network. Since the elastic unit has an elastic moiety that exhibits elasticity, the elastic unit can allow, by suitably changing a size thereof, the conductive material network to be stably maintained in contact with the active material core even when the volume of the active material core changes during charging and discharging.

In addition, the polar functional group may be one or more selected from the group consisting of a carboxylic acid group; a phosphonic acid group; a sulfonic acid group; and a C1-C8 alkyl group substituted with a carboxylic acid group, a phosphonic acid group, or a sulfonic acid group. The polar functional group may be connected, through a chemical bond, to a functional group that is positioned on a surface of the active material core and includes —OH, and may also be connected to a functional group moiety of the elastic unit. Preferably, the polar functional group is at least one selected from the group consisting of a carboxylic acid group and a C1-C8 alkyl group substituted with a carboxylic acid group in terms of the fact that the bonding thereof with the polar functional group in the active material core is excellent.

The organic linker may be one or more selected from the group consisting of 1-pyreneacetic acid, 1-pyrenecarboxylic acid, 1-pyrenebutyric acid, dodecyl sulfonic acid, and dodecylbenzenesulfonic acid. The organic linker is preferably 1-pyrenebutyric acid. In this case, in terms of the fact that since the compound has an excellent ability to be bonded to a polar functional group located on a surface of the active material due to the inclusion of a carboxyl group and the compound includes an appropriate amount of linear alkylene groups and thus allows for the improvement of the degree of freedom of the conductive material and the formation of a flexible conductive network between negative electrode active materials, the lifetime characteristics of a battery can be advantageously improved. In addition, the organic linker being 1-pyrenebutyric acid is desirable in terms of the fact that when mixing the organic linker and a conductive material in the preparation of a negative electrode active material, the dispersibility of the conductive material can be improved due to the excellent polarity of a carboxylate group in the organic linker and therefore, the conductive material can be uniformly placed at a surface of the negative electrode active material.

The organic linker may include two different organic linkers, specifically, a first organic linker and a second organic linker.

The first organic linker may be a compound that includes a ring group having a π-electron conjugated structure and a polar functional group, and the second organic linker may be a compound that includes a C3-C20 alkyl group and a polar functional group, a compound that includes a ring group having a π-electron conjugated structure, a C3-C20 alkyl group, and a polar functional group, or a mixture thereof.

When the first organic linker and the second organic linker are used as the organic linker, the conductive material may be more effectively dispersed in a solvent during the preparation of the negative electrode active material, and since the conductive material is therefore attached to a surface of the active material core in a more effectively dispersed manner, the conductive material can be more uniformly positioned.

The first organic linker may be one or more selected from the group consisting of 1-pyreneacetic acid, 1-pyrenecarboxylic acid, and 1-pyrenebutyric acid, and the second organic linker may be one or more selected from the group consisting of dodecyl sulfonic acid and dodecylbenzenesulfonic acid.

The organic linker may include the first organic linker and the second organic linker at a weight ratio of 1:99 to 99:1, specifically 5:95 to 95:5, more specifically 10:90 to 90:10. When the first organic linker and the second organic linker satisfy the above-described weight ratio, the conductive material can be more effectively dispersed, and the conductive material may be more effectively attached to the active material core.

The organic linker may be present in an amount of 0.005 wt % to 40 wt %, preferably 1 wt % to 35 wt %, and more preferably 3 wt % to 10 wt % in the negative electrode active material, which is desirable in terms of the fact that conductive material can be effectively connected to a surface of the active material and/or to the elastic unit.

The elastic unit includes: an elastic moiety having two or more binding sites; and a functional group that is bonded to a binding site of the elastic moiety and allowed to react with a polar functional group of the organic linker.

The elastic unit may connect two or more of the plurality of conductive materials to each other. The elastic unit has elasticity, and by connecting the two or more conductive materials to each other, can provide, to the active material core, a conductive network that persists even when the volume of the active material core is expanded. In addition, the plurality of conductive materials connected by the elastic unit may form a conductive network having a netlike structure, and the conductive network having a netlike structure, which exhibits elasticity even in the volume expansion of the active material core, can provide a persistent conductive network by suitably adjusting its size. In addition, since a conductive network that covers a small area of the active material core is formed by the elastic unit, the conductive network may not act as a resistance when lithium ions are intercalated into or deintercalated from the active material core.

The elastic moiety has flexibility or elasticity, and since the elastic moiety has two or more binding sites, a functional group capable of bonding to a polar functional group of the organic linker is bonded thereto.

The elastic moiety may be at least one of a linear polymer and a multi-arm polymer, specifically at least one of a linear polymer and a multi-arm polymer to which two or more functional groups are bonded. When the elastic moiety is the above-described polymer to which two or more functional groups are bonded, the two or more functional groups may be bonded to polar functional groups of the organic linker that are connected to different conductive materials, causing the different conductive materials to be connected and the conductive materials connected to each other to form a netlike structure.

The elastic moiety may include at least one selected from among an alkylene unit and an alkyleneoxy unit, specifically at least one unit selected from the group consisting of —(CH$_2$)—, —(CH$_2$CH$_2$O)—, and —(CH$_2$CH(CH$_3$)O)—. The number of the at least one unit selected from among —(CH$_2$)—, —(CH$_2$CH$_2$O)—, and —(CH$_2$CH(CH$_3$)O)—, which is included in the elastic moiety, may be an integer of 10 to 1,000, specifically an integer of 40 to 500.

The functional group of the elastic unit may include one or more selected from the group consisting of a cyanate group, an isocyanate group (OCN), an alcohol group, and an amino group (—NH$_2$). When the functional group of the elastic unit includes one or more selected from the group consisting of a cyanate group, an isocyanate group (OCN), an alcohol group, and an amino group (—NH$_2$), the functional group may be suitably connected to a polar functional group of the organic linker through a chemical bond. Specifically, when the functional group of the elastic unit is a cyanate group, an isocyanate group (OCN), and/or an amino group (—NH$_2$) and the polar functional group of the organic linker is a carboxylic acid group, a reaction therebetween may result in the formation of an amide bond (—CO—NH—). Meanwhile, when the functional group of the elastic unit is an alcohol group and the polar functional group of the organic linker is a carboxylic acid group, a reaction therebetween may result in the formation of an ester group (—COO—).

The elastic unit may be one or more selected from among poly(hexamethylene diisocyanate) and toluene 2,4-diisocyanate (TDI)-terminated poly(propylene glycol).

The elastic unit may be present in an amount of 1 wt % to 70 wt %, preferably 5 wt % to 65 wt %, and more preferably 10 wt % to 20 wt % in the negative electrode active material, which is desirable in terms of the fact that when the volume of the active material is changed, the conductive network formed from the elastic unit can be easily maintained.

<Method of Preparing Negative Electrode Active Material>

Another aspect of the present invention provides a method of preparing the above-described negative electrode active material.

Specifically, the method of preparing the negative electrode active material of the present invention includes: dispersing a conductive material and an organic linker in a solvent; adding an active material core to the solvent and performing mixing; and adding an elastic unit to the solvent and performing mixing.

Hereinafter, the method of preparing the negative electrode active material of the present invention will be described in detail with reference to drawings. In assigning reference numerals to elements of each drawing, identical elements may be given the same reference numerals as much as possible even if shown in different drawings. In addition, in describing the present invention, when it is determined that a detailed description of a known configuration or function related to the present invention may unnecessarily obscure the gist of the present invention, the detailed description may be omitted.

FIGS. 1 to 5 are schematic drawings illustrating a method of preparing the negative electrode active material of the present invention.

Figure 1:
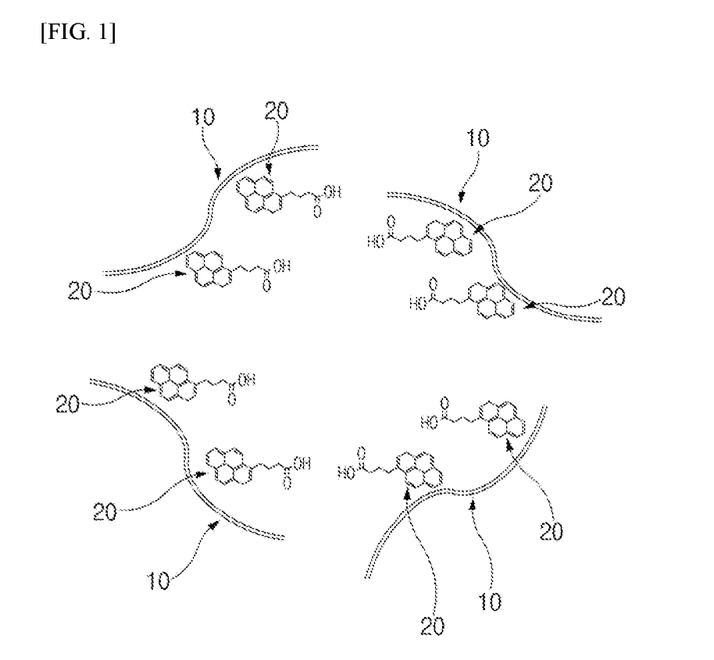
FIGS. 1 to 5 are schematic drawings illustrating a method of preparing a negative electrode active material of the present invention.

Referring to FIG. 1, conductive materials 10 and organic linkers 20 are dispersed in a solvent. The conductive material 10 and the organic linker 20 may be the same as the conductive material and the organic linker that have been described above.

Since the conductive materials 10 and the organic linkers 20 are first dispersed in a solvent as shown in FIG. 1, the organic linkers 20 can be effectively dispersed in the solvent, and at the same time, the conductive materials 10 can be effectively dispersed (i.e., debundled) in the solvent, so that the conductive material 10 and a hydrophobic group in the organic linker 20 can be bonded to each other by van der Waals attraction. When the conductive material and the organic linker are mixed with an active material core, an elastic unit, and the like which will be described below without being first dispersed, the phenomenon in which the conductive material agglomerates may be intensified, making it difficult for the conductive material to be bonded to the organic linker by van der Waals attraction, and therefore, the bonding between the conductive material and the active material core or the bonding between conductive materials by the elastic unit may not be formed.

When the conductive material 10 and the organic linker 20 are first dispersed, the solvent may be a polar solvent. When the organic linker and the conductive material are dispersed in a polar solvent, the organic linker can be more easily dispersed, and the polar functional group of the organic linker can have a strong polarity. As the polar functional group therefore reacts with a hydroxyl group of a surface of the active material core or with a functional group of the elastic unit, the conductive material may be connected to the surface of the active material core by the organic linker, or different conductive materials may be connected to each other by the elastic unit. The polar solvent may be N-methylpyrrolidone and/or an aqueous NaOH solution, and is preferably N-methylpyrrolidone in terms of the ability thereof to allow the elastic unit to be easily mixed and dispersed in a solvent without the occurrence of phase separation. When the solvent is not a polar solvent, there is a risk that the organic linker may not be dispersed in the solvent, and since it may be difficult for the polar functional group of the organic linker to react with the surface of the active material core and/or with the elastic unit, it may be difficult to form the negative electrode active material of the present invention.

Figure 2:
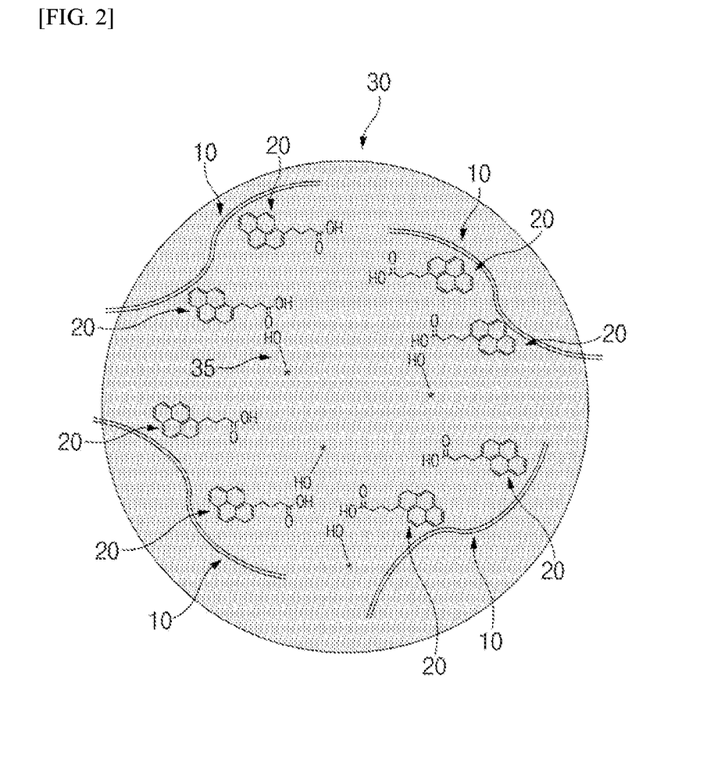
Figure 3:
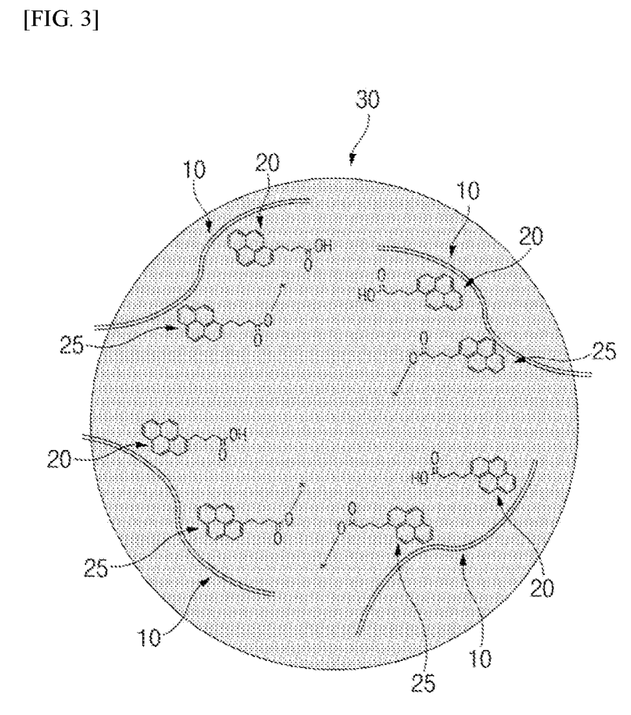

Referring to FIGS. 2 and 3, an active material core 30 is added to the solvent and mixed. The active material core 30 has been described above.

Referring to FIG. 2, a functional group 35 such as a hydroxyl group (—OH group) may be present on the active material core 30. The functional group 35 is attached to a surface of the active material core through a binding site (*), and it may have been formed as the surface of the active material core 30 is oxidized by oxygen in the air.

Referring to FIG. 3, a functional group 35 positioned on a surface of the active material core 30 may react with some of the organic linker 20 and form an assembled body 25 (active material core/organic linker/conductive material). The conductive material 10 and the surface of the active material core 30 can be connected to each other as the assembled body 25 (active material core/organic linker/conductive material).

Figure 4:
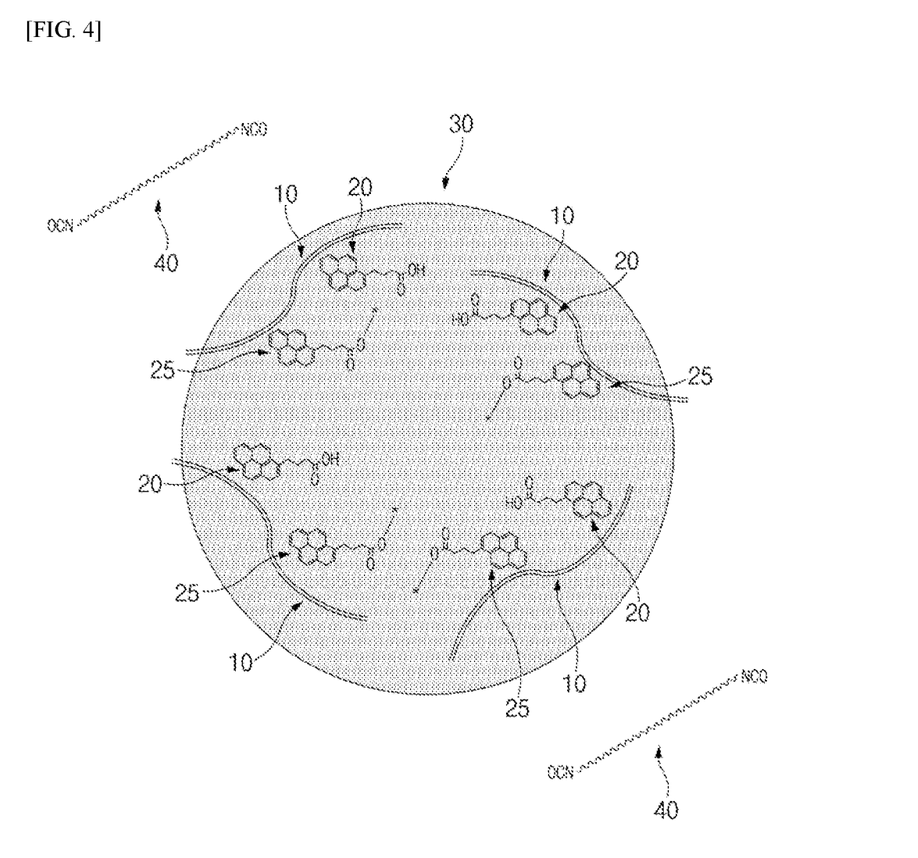
Figure 5:
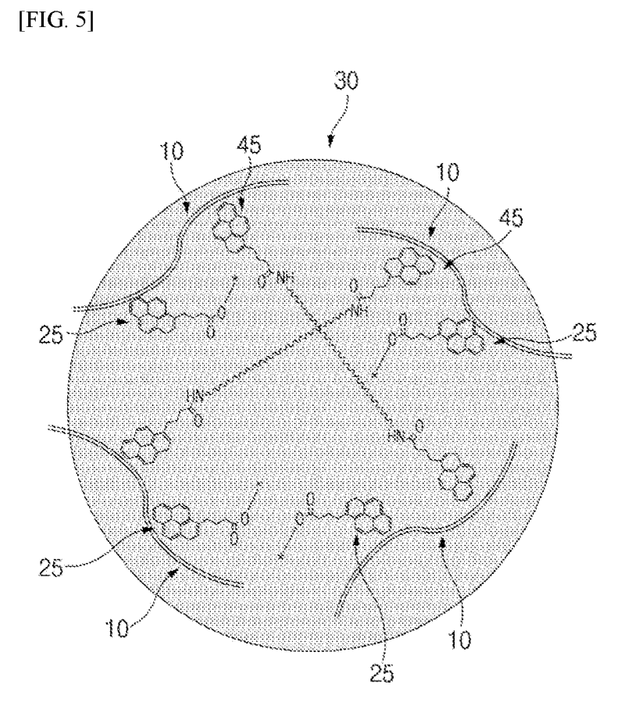

Referring to FIGS. 4 and 5, elastic units 40 are added to the solvent and mixed. The elastic unit 40 may be the same as the elastic unit described above.

Referring to FIGS. 4 and 5, the elastic unit 40 includes, at two or more termini thereof, a functional group capable of reacting with the polar functional group of the organic linker, such as an isocyanate group. Accordingly, some of the plurality of the organic linkers 20 may react with the functional group of the elastic unit 40 and thereby form an assembled body 45 (conductive material/organic linker/elastic unit/organic linker/conductive material). Accordingly, two or more of the plurality of conductive materials 10 can be connected to each other through the elastic unit 40.

In this case, the process of dispersing the organic linker and the conductive material in the solvent, the process of adding the elastic unit, and the process of adding the active material core may be carried out by a conventional mixing method, for example, a milling method such as sonication, ball-milling, bead-milling, basket-milling, or the like or a method using a mixing device such as a homogenizer, a bead mill, a ball mill, a basket mill, an attrition mill, a universal stirrer, a clear mixer, a TK mixer, or the like.

As a result of the above-described processes, a surface of the active material core 30 and the conductive material 10 can be connected to each other through the organic linker 20, and two or more conductive materials can be connected to each other by the organic linker 20 and the elastic unit 40 and thereby form a conductive network. With the conductive network formed as thus, the conductive material can provide an electrical conductivity that persists even when the volume of the negative electrode active material changes due to charging and discharging, and improved lifetime characteristics can be exhibited.

<Negative Electrode for Lithium Secondary Battery and Lithium Secondary Battery>

Other aspects of the present invention provide a negative electrode, which includes the above-described negative electrode active material, and a lithium secondary battery.

Specifically, the negative electrode includes: a negative electrode current collector; and a negative electrode active material layer formed on the negative electrode current collector and including a negative electrode material, wherein the negative electrode material includes the above-described negative electrode active material.

The negative electrode current collector is not particularly limited as long as it does not cause a chemical change in the battery and has high conductivity. Specifically, as the negative electrode current collector, copper, stainless steel, aluminum, nickel, titanium, calcined carbon, copper or stainless steel whose surface has been treated with carbon, nickel, titanium, silver, etc., an aluminum-cadmium alloy, or the like may be used.

The negative electrode current collector may typically have a thickness of 3 to 100 μm.

The negative electrode current collector may have fine irregularities formed in a surface thereof to increase the adhesion of the negative electrode active material. For example, the negative electrode current collector may be used in any of various forms such as a film, a sheet, a foil, a net, a porous material, a foam, a non-woven fabric, and the like.

The negative electrode active material layer is formed on the negative electrode current collector, and includes a negative electrode material including the above-described negative electrode active material.

The negative electrode material may further include a carbon-based active material along with the above-described negative electrode active material. The carbon-based active material may impart excellent cycle characteristics or excellent battery lifetime characteristics to the negative electrode or the secondary battery of the present invention.

Specifically, the carbon-based active material may include at least one selected from the group consisting of graphite, artificial graphite, natural graphite, hard carbon, soft carbon, carbon black, acetylene black, Ketjen black, Super P, graphene, and fibrous carbon, and preferably at least one selected from the group consisting of graphite, artificial graphite, and natural graphite.

The negative electrode material may be present in an amount of 60 wt % to 99 wt % and preferably 65 wt % to 90 wt % in the negative electrode active material layer.

The negative electrode active material layer includes a binder. The binder may include at least one selected from the group consisting of a polyvinylidene fluoride-hexafluoropropylene copolymer (PVDF-co-HFP), polyvinylidene fluoride, polyacrylonitrile, polyacrylamide, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated-EPDM, styrene-butadiene rubber (SBR), fluororubber, polyacrylic acid, and materials in which hydrogens thereof have been substituted with Li, Na, K, etc., and various copolymers thereof.

The binder may be present in an amount of 0.5 wt % to 30 wt % and preferably 5 wt % to 25 wt % in the negative electrode active material layer.

The negative electrode active material layer may further include an additional conductive material.

The additional conductive material is not particularly limited as long as it does not cause a chemical change in the battery and has conductivity, and, for example, at least one selected from the group consisting of the following may be used: graphite such as natural graphite, artificial graphite, or the like; carbon black such as acetylene black, Ketjen black, channel black, furnace black, lamp black, thermal black, or the like; a conductive fiber such as carbon fiber, metal fiber, or the like; a conductive tube such as a CNT; fluorocarbon; a metal powder such as aluminum powder, nickel powder, or the like; a conductive whisker such as zinc oxide, potassium titanate, or the like; a conductive metal oxide such as titanium oxide or the like; and a conductive material such as a polyphenylene derivative or the like. Preferably, at least one selected from the group consisting of the following is used: graphite such as natural graphite, artificial graphite, or the like; and carbon black such as acetylene black, Ketjen black, channel black, furnace black, lamp black, thermal black, or the like.

The additional conductive material may be present in an amount of 0.5 wt % to 25 wt % and preferably 3 wt % to 20 wt % in the negative electrode active material layer.

The thickness of the negative electrode active material layer may be 10 μm to 200 μm and preferably 20 μm to 150 μm.

The negative electrode may be prepared by applying a negative electrode slurry including a negative electrode material, a binder, a conductive material, and/or a solvent for forming a negative electrode slurry onto the negative electrode current collector, and then carrying out drying and rolling.

The solvent for forming a negative electrode slurry may be an organic solvent such as N-methyl pyrrolidone (NMP), dimethyl formamide (DMF), acetone or dimethyl acetamide, or water or the like, and these solvents may be used alone or in a combination of two or more.

In addition, the present invention provides a lithium secondary battery, which includes: the above-described negative electrode; a positive electrode disposed opposite to the negative electrode for a lithium secondary battery; a separator interposed between the negative electrode for a lithium secondary battery and the positive electrode; and an electrolyte.

The negative electrode has been described above.

The positive electrode may include: a positive electrode current collector; and a positive electrode active material layer formed on the positive electrode current collector and including a positive electrode active material.

In the positive electrode, the positive electrode current collector is not particularly limited as long as it does not cause a chemical change in the battery and has conductivity, and, for example, stainless steel, aluminum, nickel, titanium, calcined carbon, aluminum or stainless steel whose surface has been treated with carbon, nickel, titanium, silver, etc., or the like may be used. In addition, the positive electrode current collector may typically have a thickness of 3 μm to 500 μm, and may have fine irregularities formed in a surface thereof to increase the adhesion of the positive electrode active material. For example, the positive electrode current collector may be used in any of various forms such as a film, a sheet, a foil, a net, a porous material, a foam, a non-woven fabric, and the like.

The positive electrode active material may be a typically used positive electrode active material. Specifically, examples of the positive electrode active material may include: a layered compound such as a lithium cobalt oxide (LiCoO$_2$), a lithium nickel oxide (LiNiO$_2$), Li[Ni$_x$Co$_y$Mn$_z$M$_v$]O$_2$ (here, M is any one or more elements selected from the group consisting of Al, Ga, and In; and $0.3 \leq x < 1.0$, $0 \leq y$, $z \leq 0.5$, $0 \leq v \leq 0.1$, and $x+y+z+v=1$), Li(Li$_a$M$_{b-a-b}$M'$_{b'}$)O$_{2-c}$A$_c$ (here, $0 \leq a \leq 0.2$, $0.6 \leq b \leq 1$, $0 \leq b' \leq 0.2$, and $0 \leq c \leq 0.2$; M includes Mn and one or more selected from the group consisting of Ni, Co, Fe, Cr, V, Cu, Zn, and Ti; M' is one or more selected from the group consisting of Al, Mg, and B, and A is one or more selected from the group consisting of P, F, S, and N), or the like or a compound substituted with one or more transition metals; a lithium manganese oxide such as one represented by the chemical formula Li$_{1+y}$Mn$_{2-y}$O$_4$ (here, y is 0 to 0.33), LiMnO$_3$, LiMn$_2$O$_3$, LiMnO$_2$, or the like; a lithium copper oxide (Li$_2$CuO$_2$); a vanadium oxide such as LiV$_3$O$_8$, LiFe$_3$O$_4$, V$_2$O$_5$, Cu$_2$V$_2$O$_7$, or the like; a Ni-site-type lithium nickel oxide represented by the chemical formula LiNi$_{1-y}$M$_y$O$_2$ (here, M=Co, Mn, Al, Cu, Fe, Mg, B, or Ga, and y is 0.01 to 0.3); a lithium manganese composite oxide represented by the chemical formula LiMn$_{2-y}$M$_y$O$_2$ (here, M=Co, Ni, Fe, Cr, Zn, or Ta, and y is 0.01 to 0.1) or Li$_2$Mn$_3$MO$_8$ (here, M=Fe, Co, Ni, Cu, or Zn); LiMn$_2$O$_4$ in which some Li in the chemical formula have been substituted with alkaline earth metal ions; a disulfide compound; Fe$_2$(MoO$_4$)$_3$; and the like, but the present invention is not limited thereto. The positive electrode may be a Li-metal.

The positive electrode active material layer may include a positive electrode conductive material and a positive electrode binder along with the above-described positive electrode active material.

Here, the positive electrode conductive material is used to impart conductivity to the electrode, and may be used without particular limitation as long as it does not cause a chemical change in a battery being produced and has electron conductivity. Specific examples of the positive electrode conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber of copper, nickel, aluminum, silver, or the like; a conductive whisker such as zinc oxide, potassium titanate, or the like; a conductive metal oxide such as titanium oxide or the like; and a conductivity polymer such as a polyphenylene derivative or the like, which may be used alone or in combination of two or more thereof.

In addition, the positive electrode binder serves to improve the adhesion between positive electrode active material particles and the adhesion between the positive electrode active material and a positive electrode current collector. Specific examples of the positive electrode binder include PVDF, PVDF-co-HFP, polyvinyl alcohol, polyacrylonitrile, CMC, starch, hydroxypropyl cellulose, regenerated cellulose, polyvinylpyrrolidone, polytetrafluoroethylene, polyethylene, polypropylene, an EPDM, a sulfonated-EPDM, SBR, fluororubber, various copolymers thereof, and the like, which may be used alone or in combination of two or more thereof.

The separator is used to separate the negative electrode and the positive electrode and provide a passage for lithium ion migration. As the separator, a separator commonly used in a secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a common porous non-woven fabric, for example, a non-woven fabric made of high-melting-point glass fiber, polyethylene terephthalate fiber, or the like may be used. Also, in order to ensure heat resistance or mechanical strength, a coated separator that includes a ceramic component or polymer material and is optionally in a single-layer or multi-layer structure may be used.

Examples of the electrolyte include an organic liquid electrolyte, an inorganic liquid electrolyte, a solid polymer electrolyte, a gel-type polymer electrolyte, an inorganic solid electrolyte, a molten-type inorganic electrolyte, and the like which are usable for manufacturing a lithium secondary battery, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, an ether, methyl propionate, ethyl propionate, or the like may be used.

In particular, among the carbonate-based organic solvents, ethylene carbonate and propylene carbonate, which are cyclic carbonates, can be suitably used because they are highly viscous organic solvents that have high dielectric constants and thus effectively dissociate lithium salts. Such a cyclic carbonate can be more suitably used because it may yield an electrolyte having high electrical conductivity when mixed with a linear carbonate having low viscosity and a low dielectric constant, such as dimethyl carbonate or diethyl carbonate, in an appropriate ratio.

A lithium salt may be used as the metal salt, and the lithium salt is easily dissolved in the non-aqueous electrolyte. For example, the anion of the lithium salt may be one or more selected from the group consisting of $F^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the above-described electrolyte components, the electrolyte may further include one or more additives, for example, a haloalkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, an ethylene glycol dialkyl ether, an ammonium salt, pyrrole, 2-methoxyethanol, aluminum trichloride, or the like for the purpose of improving battery lifetime characteristics, suppressing a reduction in battery capacity, improving battery discharge capacity, and the like.

According to another embodiment of the present invention, there is provided a battery module that includes the secondary battery as a unit cell and a battery pack that includes the battery module. Due to the inclusion of the secondary battery that has high capacity, high rate capability, and excellent cycle characteristics, the battery module and the battery pack can be used as a power source for medium-to-large-sized devices selected from the group consisting of electric vehicles, hybrid electric vehicles, plug-in hybrid electric vehicles, and a system for storing electric power.

EXAMPLES

Hereinafter, exemplary embodiments will be provided to facilitate understanding of the present invention, but it will be apparent to those skilled in the art that the exemplary embodiments are merely illustrative of the present disclosure, and that various changes and modifications can be made within the scope and technical spirit of the present disclosure and are encompassed in the scope of the appended claims.

Example 1: Si/PBA/SWCNT 1%-Crosslink 0.1 g of 1-pyrenebutyric acid (PBA) was dissolved in 100 g of an N-methylpyrrolidone solvent. After adding 0.01 g of single-walled carbon nanotubes (SWCNTs) to the prepared solution, probe-type sonication was carried out for 30 minutes. Next, after adding 1 g of a Si powder to the prepared solution, 30-minute sonication and then one-hour stirring were carried out. To the dispersion solution prepared as thus, 0.2 g of toluene 2,4-diisocyanate-terminated poly(propylene glycol), which is an elastic unit, was added, followed by 24-hour stirring at 80° C.

In the above solution, the carboxylate group of the PBA reacted with, and thereby was bonded to, a hydroxyl group of a surface of the active material core, and since the hydrophobic group (pyrene group) of the PBA was bonded to the conductive material by van der Waals attraction, the conductive material and a surface of the active material were connected to each other. In addition, since the carboxylate group of the PBA that had not reacted with a hydroxyl group of the active material core reacted with an isocyanate group of the elastic unit and thereby formed an amide bond, two or more conductive materials were connected to each other through the elastic unit and thereby formed a conductive network.

After the reaction was completed, the resultant solution was filtered, washed, and dried, and thereby a negative electrode active material of Example 1 (Si/PBA/SWCNT 1%-crosslink) was prepared. Here, "SWCNT 1%" means that the content of the SWCNTs was 1 wt % relative to the active material core (Si).

Using the above-described negative electrode active material, a negative electrode for battery performance evaluation was prepared as follows. After preparing a slurry by adding distilled water to a 70:20:10 (w/w) mixture of the Si/PBA/SWCNT 1%-crosslink, Super-C, and polyacrylic acid (PAA), the slurry was applied to a copper foil and pre-dried at about 60° C. for six hours, and was completely dried in a vacuum oven at 130° C. for 12 hours, and thereby a negative electrode was obtained.

Example 2: Si/PBA/SWCNT 0.1%-Crosslink

The negative electrode active material of Example 2 (Si/PBA/SWCNT 0.1%-crosslink) was prepared in the same manner as in Example 1 except that 0.01 g (rather than 0.1 g as in Example 1) of PBA, 0.001 g (rather than 0.01 g as in Example 1) of SWCNTs, and 0.02 g (rather than 0.2 g as in Example 1) of toluene 2,4-diisocyanate-terminated poly(propylene glycol) were used. Here, "SWCNT 0.1%" means that the content of the SWCNTs was 0.1 wt % relative to the active material core (Si).

A negative electrode was prepared in the same manner as in Example 1 except that the negative electrode active material prepared above was used.

Example 3: Si/PBA/SWCNT 10%-Crosslink

The negative electrode active material of Example 3 (Si/PBA/SWCNT 10%-crosslink) was prepared in the same manner as in Example 1 except that 1 g (rather than 0.1 g as in Example 1) of PBA, 0.1 g (rather than 0.01 g as in Example 1) of SWCNTs, and 2 g (rather than 0.2 g as in Example 1) of toluene 2,4-diisocyanate-terminated poly(propylene glycol) were used. Here, "SWCNT 10%" means that the content of the SWCNTs was 10 wt % relative to the active material core (Si).

A negative electrode was prepared in the same manner as in Example 1 except that the negative electrode active material prepared above was used.

Comparative Example 1

In Comparative Example 1, 0.1 g of PBA was dissolved in 100 g of an N-methylpyrrolidone solvent. After adding 0.01 g of SWCNTs to the prepared solution and carrying out probe-type sonication for 30 minutes, 1 g of a Si powder was added to the prepared solution, followed by 30-minute sonication and subsequent one-hour stirring. The dispersion solution prepared as thus was filtered and then washed by carrying out filtration while pouring water several times. The obtained material was dried for 12 hours in a vacuum oven at 130° C., and thereby a negative electrode active material of Comparative Example 1 (Si/PBA/SWCNT 1%) was obtained. Here, "SWCNT 1%" means that the content of the SWCNTs was 1 wt % relative to the active material core (Si).

A negative electrode was prepared in the same manner as in Example 1 except that the negative electrode active material prepared above was used.

Comparative Example 2

A negative electrode slurry was prepared by adding a 70:1:10:10:9:10 (w/w) mixture of Si, SWCNTs, toluene 2,4-diisocyanate-terminated poly(propylene glycol), Super-C, and PAA to water and performing stirring. After applying the slurry to a copper foil and pre-drying the same at about 60° C. for six hours, the resultant was completely dried in a vacuum oven at 130° C. for 12 hours, and thereby a negative electrode was obtained.

In the case of Comparative Example 2, since PBA, which is an organic linker, was not added, the bonding between the conductive material of the present invention and a surface of the active material core and the formation of a conductive network by the elastic unit were not achieved.

EXPERIMENTAL EXAMPLES

Coin-type half-cells were manufactured using the negative electrodes prepared in Examples 1 to 3 and Comparative Examples 1 and 2. A metal lithium foil was used as the positive electrode, and an electrode assembly was manufactured by interposing a polyethylene separator between the negative electrode and the positive electrode.

After placing the electrode assembly in a battery case, an electrolyte prepared by adding 1 M LiPF$_6$ to a non-aqueous solvent which includes a 1:2 (volume ratio) mixture of ethylene carbonate and diethyl carbonate was injected, and thereby a coin-type half-cell was obtained.

Experimental Example 1: Evaluation of Initial Discharge Capacity and Initial Efficiency The charging and discharging characteristics of the coin-type half-cells manufactured using the negative electrodes prepared in Examples 1 to 3 and Comparative Examples 1 and 2 were evaluated.

A first cycle of charging/discharging was carried out at a current density of 0.1 C/0.1 C, and the following cycles of charging/discharging were carried out at a current density of 0.5 C/0.5 C, and detailed conditions thereof are as follows. The charging was carried out in a CC mode up to 50% based on the 1C discharge capacity at a predetermined current density, and the discharging was carried out in a CC mode up to 1 V at a determined current density and completed.

The initial discharge capacity and initial efficiency (=initial discharge capacity/initial charge capacity×100) of Examples and Comparative Examples at the first cycle of charging/discharging are shown in the following Table 1.

TABLE 1

|  | Initial discharge capacity (mAh/g) | Initial efficiency (%) |
|---|---|---|
| Example 1 | 1763.6 | 91.9 |
| Example 2 | 1692.5 | 90.3 |
| Example 3 | 572.8 | 89.4 |
| Comparative Example 1 | 1686.1 | 88.0 |
| Comparative Example 2 | 1610.2 | 84.1 |

Referring to Table 1, it can be seen that the secondary batteries of Examples 1 to 3 have excellent initial efficiency compared to Comparative Examples.

Experimental Example 2: Evaluation of Cycle Capacity Retention Rate

The charging and discharging characteristics of the coin-type half-cells manufactured using the negative electrodes prepared in Examples 1 to 3 and Comparative Examples 1 and 2 were evaluated.

A first cycle of charging/discharging was carried out at a current density of 0.1 C/0.1 C, and the following cycles of charging/discharging were carried out at a current density of 0.5 C/0.5 C, and detailed conditions thereof are as follows. The charging was carried out in a CC mode up to 50% based on the 1C discharge capacity at a predetermined current density, and the discharging was carried out in a CC mode up to 1 V at a determined current density and completed. The capacity retention rate according to the number of cycles is shown in FIG. 6.

Figure 6:
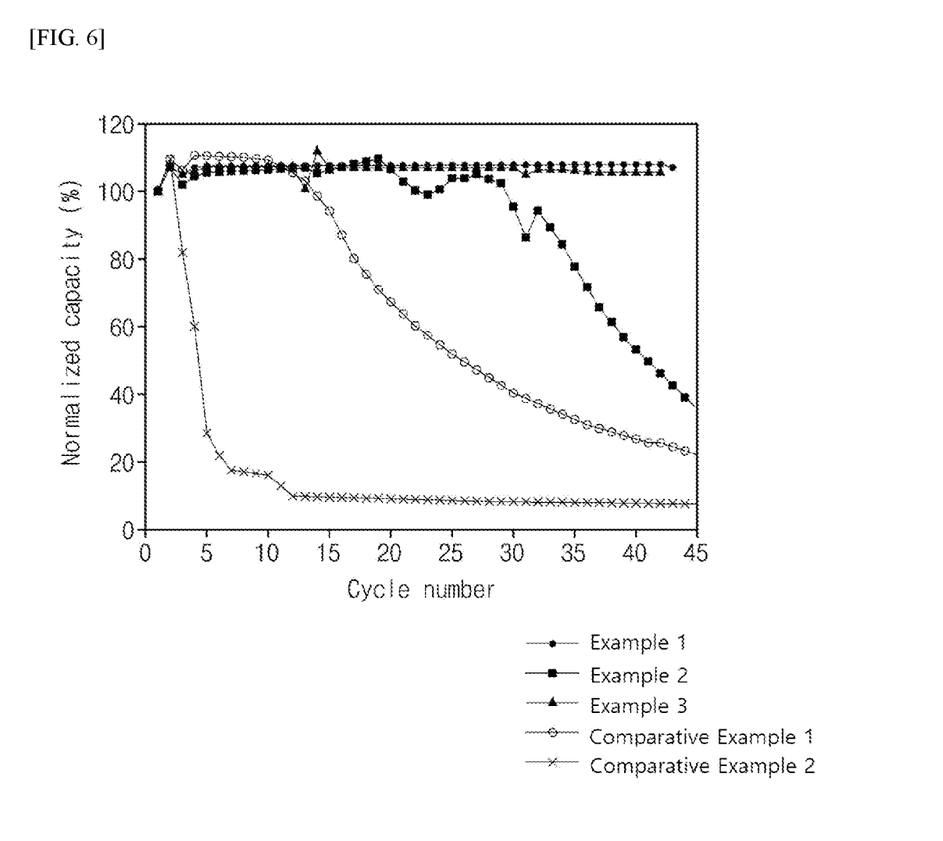
FIG. 6 is a graph showing the result of evaluating a capacity retention rate according to the number of cycles for Examples 1 to 3 and Comparative Examples 1 and 2.

Referring to FIG. 6, it can be seen that in the case of Examples 1 to 3, the cycle lifetime characteristics are greatly improved compared to Comparative Examples 1 and 2.

In the case of Comparative Example 1, it is determined that the cycle capacity retention rate was lowered because the connection between conductive materials that may be made by an elastic unit was not made in the negative electrode active material and thus it was difficult to provide a conductivity that was persistent and had resilience to a volume change of the active material core.

In the case of Comparative Example 2, it can be seen that cycle lifetime characteristics were significantly lowered because no organic linker component was used and thus a conductive network that may be formed by the connection between the conductive material and the active material core and between conductive materials could not be formed.

DESCRIPTION OF SYMBOLS

10: CONDUCTIVE MATERIAL
20: ORGANIC LINKER
25: ASSEMBLED BODY (ACTIVE MATERIAL CORE/ORGANIC LINKER/CONDUCTIVE MATERIAL)
30: ACTIVE MATERIAL CORE
35: FUNCTIONAL GROUP ON SURFACE OF ACTIVE MATERIAL CORE
40: ELASTIC UNIT
45: ASSEMBLED BODY (CONDUCTIVE MATERIAL/ORGANIC LINKER/ELASTIC UNIT/ORGANIC LINKER/CONDUCTIVE MATERIAL)

The invention claimed is:

1. A negative electrode active material comprising:
an active material core that allows for intercalation and deintercalation of lithium ions;
a plurality of conductive materials positioned on a surface of the active material core;
a plurality of organic linkers,
wherein each organic linker comprises a hydrophobic group and a polar functional group bonded to the hydrophobic group; and
an elastic unit,
wherein the elastic unit comprises:
an elastic moiety having two or more binding sites; and
a functional group bonded to a binding site of the elastic moiety and wherein the functional group reacts with the polar functional group of the organic linker,
wherein one or more of the plurality of organic linkers are connected to the conductive materials through the hydrophobic groups of the organic linkers, and
wherein the polar functional group of the organic linker is bonded to a functional group on the surface of the active material core or to the functional group of the elastic unit.

2. The negative electrode active material of claim 1, wherein the conductive material comprises one or more selected from the group consisting of a linear conductive material and a planar conductive material, and wherein two or more of the plurality of conductive materials are connected to each other through the elastic unit.

3. The negative electrode active material of claim 2, wherein the linear conductive material is one or more selected from the group consisting of a carbon fiber, a carbon nanofiber, a metal fiber, a metal nanotube, a carbon nanotube, and a conductive whisker, and wherein the planar conductive material is one or more selected from the group consisting of graphene, a metal thin film, and a MXene.

4. The negative electrode active material of claim 1, wherein the conductive material is present in an amount of 0.05 parts by weight to 15 parts by weight relative to 100 parts by weight of the active material core.

5. The negative electrode active material of claim 1, wherein the hydrophobic group of the organic linker comprises one or more selected from the group consisting of a ring group having a π-electron conjugated structure and a C3-C20 alkyl group.

6. The negative electrode active material of claim 5, wherein the ring group having a π-electron conjugated structure comprises one or more selected from the group consisting of benzene, pyrene, naphthalene, anthracene, benzopyrene, phenanthrene, fluoranthene, chrysene, perylene, benz[a]anthracene, acenaphthylene, coronene, triphenylene, and tetracene.

7. The negative electrode active material of claim 5, wherein the ring group having a π-electron conjugated structure is a polycyclic ring group in which four or more rings are linked.

8. The negative electrode active material of claim 1, wherein the polar functional group of the organic linker is one or more selected from the group consisting of a carboxylic acid group; a phosphonic acid group; a sulfonic acid group; and a C1-C8 alkyl group substituted with a carboxylic acid group, a phosphonic acid group, or a sulfonic acid group.

9. The negative electrode active material of claim 1, wherein the organic linker is one or more selected from the group consisting of 1-pyreneacetic acid, 1-pyrenecarboxylic acid, 1-pyrenebutyric acid, dodecyl sulfonic acid, and dodecylbenzenesulfonic acid.

10. The negative electrode active material of claim 1, wherein the active material core that allows the intercalation and deintercalation of lithium ions is one or more selected from the group consisting of Si, $SiO_x$ wherein $0<x<2$, Sn, $SnO_2$, and an Si-metal alloy.

11. The negative electrode active material of claim 1, wherein the elastic moiety is one or more selected from the group consisting of a linear polymer and a multi-arm polymer.

12. The negative electrode active material of claim 1, wherein the elastic moiety comprises at least one selected from the group consisting of an alkylene unit and an alkyleneoxy unit.

13. The negative electrode active material of claim 1, wherein the functional group of the elastic unit comprises one or more selected from the group consisting of a cyanate group, an isocyanate group, an alcohol group, and an amino group.

14. The negative electrode active material of claim 1, wherein the elastic unit is one or more selected from the group consisting of poly(hexamethylene diisocyanate) and toluene 2,4-diisocyanate-terminated poly(propylene glycol).

15. A negative electrode comprising:
a negative electrode current collector; and
a negative electrode active material layer is formed on the negative electrode current collector, wherein the negative electrode material layer comprises the negative electrode active material of claim 1.

16. A lithium secondary battery comprising:
the negative electrode of claim 15;
a positive electrode disposed opposite to the negative electrode;
a separator interposed between the negative electrode and the positive electrode; and
an electrolyte.

* * * * *